Feb. 13, 1951 W. A. BEATTY 2,541,023

MULTIPLEX PULSE TRANSMISSION SYSTEM

Original Filed Jan. 24, 1941

INVENTOR.
WILLIAM ARNOLD BEATTY

BY

R. P. Morris
ATTORNEY

Patented Feb. 13, 1951 2,541,023

UNITED STATES PATENT OFFICE 2,541,023

MULTIPLEX PULSE TRANSMISSION SYSTEM

William Arnold Beatty, London, England, assignor to International Standard Electric Corporation, New York, N. Y.

Original application January 24, 1941, Serial No. 375,814. Divided and this application September 20, 1947, Serial No. 775,326

7 Claims. (Cl. 179—15)

Figure 1:
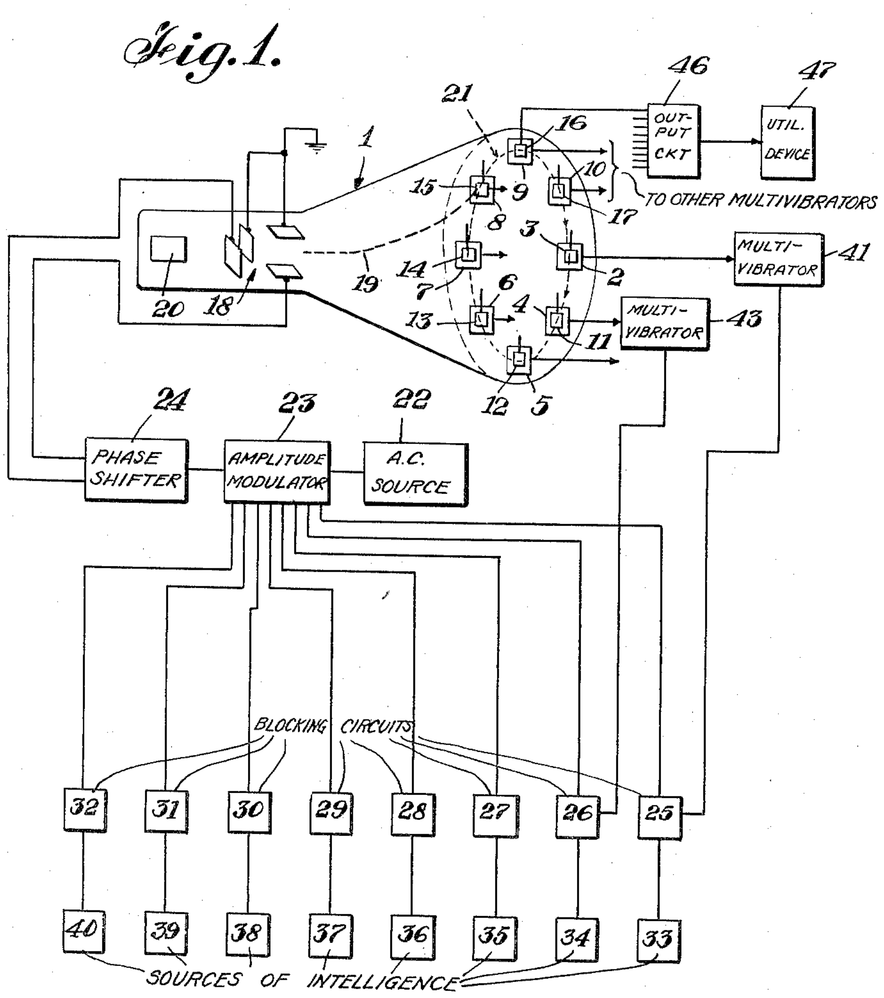
Figure 2:
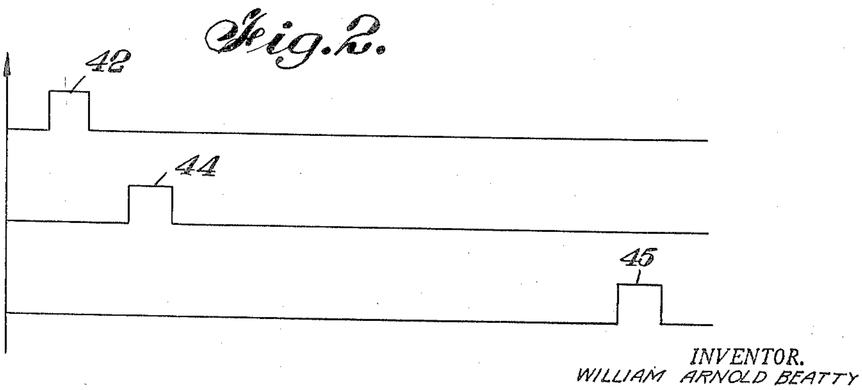

This invention relates to multiplex transmission systems, particularly those utilizing pulses of variable duration.

This is a division of my copending application W. A. Beatty 42, filed January 23, 1941. Serial No. 375,814, now Patent No. 2,462,061 dated February 22, 1949, entitled "High Frequency Transmission System."

An object of this invention is the provision of an improved multiplex transmission system utilizing variable duration width pulses, and a cathode ray tube for the production of said pulses.

In accordance with a feature of this invention, pulses are produced whose width or duration varies in accordance with instantaneous amplitudes of the signal in a given channel. The system is used for multiplex transmission, and a single cathode ray tube is used to produce the width modulated pulses and to distribute or mix them in a single output circuit. This is accomplished in accordance with a feature of the invention by deflecting an electron beam in a given coordinate so as to scan cyclically a plurality of target structures, the target structures being designed to provide different traversal times at different displacements in a second coordinate. The displacement of the beam in the second coordinate is successively controlled by the instantaneous amplitude of the signal wave in successive channels correlated with the impingement of the beam on corresponding target structures. In the example illustrated a polar coordinate system is shown.

One method of performing multiplex transmission utilizing the present invention will be more readily understood by referring to the drawing Figures I and II of which show a schematic circuit diagram partly in block form of an embodiment of my invention and a set of curves used in explaining the invention respectively.

A cathode ray tube 1, Figure I, has 8 similar pairs of target plates, as shown in Fig. 16 of the parent application, the plates of each pair being arranged one behind the other. The plate 2 is larger than the plate 3 and is placed behind it as shown. Plates 2, 4, 5, 6, 7, 8, 9 and 10 are utilized as circuit switching plates, while the smaller plates 3, 11, 12, 13, 14, 15, 16 and 17 are used for the purpose of generating variable width modulated pulses. The plates as shown have parallel sides this particular shape being taken for exemplary purposes only. Electrostatic deflecting means such as plates 18 are available in the cathode ray tube, and an electron beam 19 produced by the conventional electron gun 20 follows a circular path 21 across all the switching and modulating plates. The alternating current source 22, Fig. I, supplies current at a frequency equal to the desired pulse repetition frequency to an amplitude modulating unit 23 and a phase splitting unit 24, whence the alternating current is fed in phase quadrature to the deflecting plates 18 of the cathode ray tube 1 giving the trace 21 already mentioned.

One of the blocking circuits 25—32 is interposed between each source of intelligence 33—40 and the modulating unit 23, a separate blocking circuit being allocated to each intelligence source. Normally the several blocking circuits operate to prevent signals from the various intelligence sources from reaching the modulating unit 23.

Considering the electron beam in the tube 1 just before it strikes the plate 2, the operation is as follows. The beam is not resting on any plate and in this condition all the blocking circuits are operative. Immediately the beam strikes plate 2 a pulse is derived therefrom and this pulse can be utilized to trigger a double stability circuit of known type, such as multivibrator 41, setting up the pulse 42, Fig. II. The pulse 42 serves to so bias the blocking circuit 25 that it becomes inoperative and allows the signal intelligence from source 33 to pass to the modulating unit 23, thereby changing the amplitude of the alternating current from the source 22 in accordance with the amplitude of the signal from the source 33. Assuming that the change in amplitude is such that the signal fed in phase quadrature from the unit 24 decreases the diameter of the trace 21 then the beam as it passes over plate 3 takes a longer period of time to pass completely across the plate than would be the case when no modulation was taking place. Alternatively, if the modulation should increase the diameter of the trace 21, the result will be for the beam to take a shorter period of time than normal to cross the plate 3. The electron beam therefore crosses the plate 3 giving a pulse having a duration which is a time function of the amplitude of the signal from the source 33. Immediately the beam leaves the plate 3 it once more strikes plate 2 giving another pulse serving to trigger the double stability circuit (multivibrator 41) in the reverse direction and thus discontinuing the pulse 42, whereupon the bias is removed from the blocking circuit 25 thereby making this circuit operative once more and cutting off the signal intelligence from the source 33.

The electron beam continues on its travel and after a very short time period strikes the switching plate 4 setting up via another double stability circuit, multivibrator 43, the pulse 44, which serves to unblock the circuit 26, allowing the signal from the source 34 to pass to the modulating unit 23, modifying the diameter of the trace 21 in such a manner that the pulse derived from plate 11 has a time function of the amplitude of the signal from source 34. The beam now once more strikes plate 4 discontinuing pulse 44. The other intelligence channels operate in a similar manner, the pulse 45 for the pair of plates 10 and 17 only being shown in Figure II. The smaller plates 3, and 11—17 are all coupled to a common output circuit 46 where they are mixed to form a single train and are then fed to a suitable utilization device 47 which may include conventional transmission means including a carrier frequency generator, a modulator therefor, amplifying circuits, and an antenna.

While I have shown the individual plates in cathode ray tube 1 as rectangular and arranged in a specific manner, it will be apparent that the shape of the plates may be varied to obtain any desired relation between the width modulation and the signal modulation, and further that the arrangement of the plates may likewise be varied to vary said relation or even without varying said relation.

I claim:

1. A multiplex transmission system comprising means for deflecting an electron beam in a given coordinate, a plurality of target structures arranged in the path of said beam to be cyclically scanned by the beam, said target structures being designed to provide different traversal times at different displacements in a second coordinate, means for controlling the displacement of said beam in said second coordinate in accordance with each of a number of signal waves over successive periods, means for correlating said periods with the incidence of the beam on successive target structures, and means for collecting from the target structures the current pulses of varying duration determined by the displacements of the trace in said second coordinate.

2. A multiplex transmission system according to claim 1, wherein said target structures are arranged in a circle each extending radially, and said coordinates are polar, with said given coordinate being circular and said second coordinate being radial.

3. A multiplex transmission system according to claim 2, wherein said deflecting means includes means for producing sweep currents for deflecting the beam in a circular trace, and said displacement controlling means includes means for varying the amplitude of said currents to vary the diameter of said trace.

4. A multiplex transmission system according to claim 2, wherein said deflecting means includes means for producing high frequency alternating currents in quadrature, and said deflection controlling means includes means for varying the amplitude of said currents.

5. A multiplex transmission system according to claim 1, wherein said means controlling the displacement of said beam includes a plurality of additional target elements arranged behind said target structures and each positioned to be impinged upon by the beam before it strikes the corresponding structure, and a plurality of means each responsive to the impingement of the beam on its corresponding element for initiating the control of said displacement of the beam according to the amplitude of one of said signal waves.

6. A multiplex transmission system according to claim 5, wherein each of said elements also extends beyond its corresponding target structure so as to be struck by the beam after it leaves said target structure, each of said means responsive to the impingement of the beam on said element including means responsive to the impingement of the beam as it strikes the element after leaving the corresponding target structure, for terminating control of said deflection by the corresponding signal wave.

7. A multiplex transmission system according to claim 6, including a plurality of blocking circuits, means for feeding each signal wave to a separate one of said blocking circuits, means for feeding the output of said blocking circuits to control the displacement of said beam, and means for applying pulses in response to the initial impingement of said beam on each one of said elements to unblock its corresponding blocking circuit.

WILLIAM ARNOLD BEATTY.

REFERENCES CITED

The following references are of record in the file of this patent:

UNITED STATES PATENTS

| Number | Name | Date |
|---|---|---|
| 2,154,127 | Hollman | Apr. 11, 1939 |
| 2,365,476 | Knoop | Dec. 19, 1944 |
| 2,462,061 | Beatty | Feb. 22, 1949 |

FOREIGN PATENTS

| Number | Country | Date |
|---|---|---|
| 579,126 | Great Britain | June 6, 1947 |